(12) United States Patent
Emberson

(10) Patent No.: US 9,923,651 B2
(45) Date of Patent: *Mar. 20, 2018

(54) SYSTEMS AND METHODS FOR ADAPTIVE FREQUENCY SYNCHRONIZATION

(71) Applicant: WatchGuard, Inc., Allen, TX (US)

(72) Inventor: A. Thomas Emberson, Allen, TX (US)

(73) Assignee: WatchGuard, Inc., Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/412,589

(22) Filed: Jan. 23, 2017

(65) Prior Publication Data

US 2017/0134106 A1     May 11, 2017

Related U.S. Application Data

(63) Continuation of application No. 14/595,978, filed on Jan. 13, 2015, now Pat. No. 9,660,744.

(51) Int. Cl.
*H04H 20/42* (2008.01)
*H04H 20/71* (2008.01)
(Continued)

(52) U.S. Cl.
CPC .......... *H04H 20/423* (2013.01); *H04H 20/71* (2013.01); *H04B 1/713* (2013.01); *H04B 1/715* (2013.01)

(58) Field of Classification Search
None
See application file for complete search history.

(56) References Cited

U.S. PATENT DOCUMENTS 3,752,047 A    8/1973   Gordon et al.
4,258,421 A    3/1981   Juhasz et al.
(Continued)

FOREIGN PATENT DOCUMENTS

EP       707297 A1    4/1996
FR     2698596 B1    2/1995
(Continued)

OTHER PUBLICATIONS

Hewlett-Packard, "Wi-Fi and Bluetooth—Interference Issues," http://www.hp.com/rnd/library/pdf/WiFi_Bluetooth_coexistance.pdf, Jan. 2002, six pages.

(Continued)

*Primary Examiner* — Alejandro Rivero
(74) *Attorney, Agent, or Firm* — Winstead PC

(57) ABSTRACT

In one embodiment, a method includes receiving transmission segments from at least one device over a plurality of channels pursuant to a channel-switching schedule, the channel-switching schedule comprising an iteratively-repeated channel sequence. The iteratively-repeated channel sequence comprises a plurality of channels, the channel-switching schedule specifying an assigned transmission duration for each channel. In addition, the method includes, for at least one channel of the plurality of channels, detecting interference during a time segment of the assigned transmission duration, the time segment comprising at least one of a beginning portion and an ending portion of the assigned transmission duration. Further, the method includes responsive to the detected interference, determining to shift, by a specified quantity of time, a future channel switch indicated by the iteratively-repeated channel sequence.

19 Claims, 6 Drawing Sheets

(51) Int. Cl.
　　　*H04B 1/713*　　(2011.01)
　　　*H04B 1/715*　　(2011.01)

(56)　　　　References Cited

U.S. PATENT DOCUMENTS

| | | | |
|---|---|---|---|
| 4,420,238 A | 12/1983 | Felix | |
| 4,688,244 A | 8/1987 | Hannon et al. | |
| 4,754,255 A | 6/1988 | Sanders et al. | |
| 4,786,900 A | 11/1988 | Karasawa et al. | |
| 4,789,904 A | 12/1988 | Peterson | |
| 4,831,438 A | 5/1989 | Bellman, Jr. et al. | |
| 4,843,463 A | 6/1989 | Michetti | |
| 4,949,186 A | 8/1990 | Peterson | |
| 4,992,943 A | 2/1991 | McCracken | |
| 4,993,068 A | 2/1991 | Piosenka et al. | |
| 5,027,104 A | 6/1991 | Reid | |
| 5,111,289 A | 5/1992 | Lucas et al. | |
| 5,136,655 A | 8/1992 | Bronson | |
| 5,164,827 A | 11/1992 | Paff | |
| 5,185,667 A | 2/1993 | Zimmermann | |
| 5,430,431 A | 7/1995 | Nelson | |
| 5,485,611 A | 1/1996 | Astle | |
| 5,491,464 A | 2/1996 | Carter et al. | |
| 5,491,511 A | 2/1996 | Odle | |
| 5,570,127 A | 10/1996 | Schmidt | |
| 5,579,239 A | 11/1996 | Freeman et al. | |
| 5,677,979 A | 10/1997 | Squicciarini et al. | |
| 5,682,133 A | 10/1997 | Johnson et al. | |
| 5,689,442 A | 11/1997 | Swanson et al. | |
| 5,708,780 A | 1/1998 | Levergood et al. | |
| 5,734,337 A | 3/1998 | Kupersmit | |
| 5,742,336 A | 4/1998 | Lee | |
| 5,787,367 A | 7/1998 | Berra | |
| 5,799,083 A | 8/1998 | Brothers et al. | |
| 5,815,093 A | 9/1998 | Kikinis | |
| 5,852,664 A | 12/1998 | Iverson et al. | |
| 5,857,159 A | 1/1999 | Dickrell et al. | |
| 5,890,079 A | 3/1999 | Levine | |
| 5,917,405 A | 6/1999 | Joao | |
| 5,920,338 A | 7/1999 | Katz | |
| 5,926,210 A | 7/1999 | Hackett et al. | |
| 6,008,841 A | 12/1999 | Charlson | |
| 6,028,528 A | 2/2000 | Lorenzetti et al. | |
| 6,037,977 A | 3/2000 | Peterson | |
| 6,076,026 A | 6/2000 | Jambhekar et al. | |
| 6,092,008 A | 7/2000 | Bateman | |
| 6,141,611 A | 10/2000 | Mackey et al. | |
| 6,151,065 A | 11/2000 | Steed et al. | |
| 6,211,907 B1 | 4/2001 | Scaman et al. | |
| 6,259,475 B1 | 7/2001 | Ramachandran et al. | |
| 6,330,025 B1 | 12/2001 | Arazi et al. | |
| 6,332,193 B1 | 12/2001 | Glass et al. | |
| 6,421,080 B1 | 7/2002 | Lambert | |
| 6,430,488 B1 | 8/2002 | Goldman et al. | |
| 6,490,513 B1 | 12/2002 | Fish et al. | |
| 6,518,881 B2 | 2/2003 | Monroe | |
| 6,542,076 B1 | 4/2003 | Joao | |
| 6,545,601 B1 | 4/2003 | Monroe | |
| 6,546,363 B1 | 4/2003 | Hagenbuch | |
| 6,556,905 B1 | 4/2003 | Mittelsteadt et al. | |
| 6,559,769 B2 | 5/2003 | Anthony et al. | |
| 6,631,522 B1 | 10/2003 | Erdelyi | |
| 6,636,256 B1 | 10/2003 | Passman et al. | |
| 6,684,137 B2 | 1/2004 | Takagi et al. | |
| 6,831,556 B1 | 12/2004 | Boykin | |
| 6,950,013 B2 | 9/2005 | Scaman et al. | |
| 6,950,122 B1 | 9/2005 | Mirabile | |
| 6,959,122 B2 | 10/2005 | McIntyre | |
| 6,965,400 B1 | 11/2005 | Haba et al. | |
| 7,131,136 B2 | 10/2006 | Monroe | |
| 7,180,407 B1 | 2/2007 | Guo et al. | |
| 7,190,882 B2 | 3/2007 | Gammenthaler | |
| 7,363,742 B2 | 4/2008 | Nerheim | |
| 7,382,244 B1 | 6/2008 | Donovan et al. | |
| 7,570,158 B2 | 8/2009 | Denny et al. | |
| 7,570,476 B2 | 8/2009 | Nerheim | |
| 7,768,548 B2 | 8/2010 | Silvernail et al. | |
| 7,804,426 B2 | 9/2010 | Etcheson | |
| 7,944,676 B2 | 5/2011 | Smith et al. | |
| 8,050,206 B2 | 11/2011 | Siann et al. | |
| 8,446,469 B2 | 5/2013 | Blanco et al. | |
| 8,594,485 B2 | 11/2013 | Brundula | |
| 8,781,292 B1 | 7/2014 | Ross et al. | |
| 8,805,431 B2 | 8/2014 | Vasavada et al. | |
| 8,837,901 B2 | 9/2014 | Shekarri et al. | |
| 9,058,499 B1 | 6/2015 | Smith | |
| 9,159,371 B2 | 10/2015 | Ross et al. | |
| 9,253,452 B2 | 2/2016 | Ross et al. | |
| 9,325,950 B2 | 4/2016 | Haler | |
| 9,331,997 B2 | 5/2016 | Smith | |
| 9,377,161 B2 | 6/2016 | Hanchett et al. | |
| 2002/0135679 A1 | 9/2002 | Scaman | |
| 2002/0183905 A1 | 12/2002 | Maeda et al. | |
| 2003/0052798 A1 | 3/2003 | Hanson | |
| 2003/0086000 A1 | 5/2003 | Siemens et al. | |
| 2003/0151663 A1 | 8/2003 | Lorenzetti et al. | |
| 2003/0154009 A1 | 8/2003 | Basir et al. | |
| 2003/0210329 A1 | 11/2003 | Aagaard et al. | |
| 2003/0210806 A1 | 11/2003 | Yoichi et al. | |
| 2003/0212567 A1 | 11/2003 | Shintani et al. | |
| 2004/0008255 A1 | 1/2004 | Lewellen | |
| 2004/0201765 A1 | 10/2004 | Gammenthaler | |
| 2004/0252193 A1 | 12/2004 | Higgins | |
| 2005/0083404 A1 | 4/2005 | Pierce et al. | |
| 2005/0099273 A1 | 5/2005 | Shimomura et al. | |
| 2005/0101334 A1 | 5/2005 | Brown et al. | |
| 2005/0151852 A1 | 7/2005 | Jomppanen | |
| 2005/0238084 A1* | 10/2005 | Kuperschmidt | H04L 1/0041 375/133 |
| 2005/0243171 A1 | 11/2005 | Ross et al. | |
| 2005/0258942 A1 | 11/2005 | Manasseh et al. | |
| 2006/0012683 A9 | 1/2006 | Lao et al. | |
| 2006/0133476 A1 | 6/2006 | Page et al. | |
| 2006/0209189 A1 | 9/2006 | Simpson | |
| 2006/0274166 A1 | 12/2006 | Lee et al. | |
| 2007/0013776 A1 | 1/2007 | Venetianer et al. | |
| 2007/0035612 A1 | 2/2007 | Korneluk et al. | |
| 2007/0042733 A1* | 2/2007 | Tomioka | H04W 48/18 455/179.1 |
| 2007/0188612 A1 | 8/2007 | Carter | |
| 2007/0219686 A1 | 9/2007 | Plante | |
| 2007/0260363 A1 | 11/2007 | Miller | |
| 2007/0274705 A1 | 11/2007 | Kashiwa et al. | |
| 2007/0291822 A1* | 12/2007 | Staley | H04B 1/7143 375/132 |
| 2008/0100705 A1 | 5/2008 | Kister et al. | |
| 2009/0002491 A1 | 1/2009 | Haler | |
| 2009/0088267 A1 | 4/2009 | Shimazaki et al. | |
| 2009/0195655 A1 | 8/2009 | Pandey | |
| 2009/0207252 A1 | 8/2009 | Raghunath | |
| 2009/0213902 A1 | 8/2009 | Jeng | |
| 2009/0257396 A1* | 10/2009 | Eliezer | H04B 1/036 370/330 |
| 2010/0026802 A1 | 2/2010 | Titus et al. | |
| 2010/0321183 A1 | 12/2010 | Donovan et al. | |
| 2011/0052137 A1 | 3/2011 | Cowie | |
| 2011/0285845 A1 | 11/2011 | Bedros et al. | |
| 2014/0044151 A1 | 2/2014 | Sarca et al. | |
| 2014/0139680 A1 | 5/2014 | Huang et al. | |
| 2014/0192192 A1 | 7/2014 | Worrill et al. | |
| 2014/0355951 A1 | 12/2014 | Tabak | |
| 2015/0051502 A1 | 2/2015 | Ross | |
| 2015/0063776 A1 | 3/2015 | Ross et al. | |
| 2016/0035391 A1 | 2/2016 | Ross et al. | |

FOREIGN PATENT DOCUMENTS

| | | |
|---|---|---|
| GB | 2287152 A | 9/1995 |
| GB | 2317418 A | 3/1998 |
| JP | 2006311039 A | 11/2006 |
| KR | 1050897 | 7/2011 |
| WO | WO-1993020655 A1 | 10/1993 |
| WO | WO-1994019212 A2 | 9/1994 |

(56) References Cited

FOREIGN PATENT DOCUMENTS

| WO | WO-1995028783 A1 | 10/1995 |
| WO | WO-1996022202 A1 | 7/1996 |
| WO | WO-1997038526 A1 | 10/1997 |
| WO | WO-1998052358 A1 | 11/1998 |
| WO | WO-1999018410 A1 | 4/1999 |
| WO | WO-01097524 A1 | 12/2001 |
| WO | WO-2004/036926 A2 | 4/2004 |
| WO | WO-2007104367 A1 | 9/2007 |
| WO | WO-2013100933 A1 | 7/2013 |
| WO | WO-2013100993 A1 | 7/2013 |
| WO | WO-2014000161 A1 | 1/2014 |

OTHER PUBLICATIONS

Hodgdon, Charles; "Adaptive Frequency Hopping for Reduced Interference between Bluetooth and Wireless LAN"; http://www.design-reuse.com/articles/5715/adaptive-frequency-hopping-for-reduced-interference-between-bluetooth-and-wireless-lan.html; May 2003; five pages.

Rowe, Lawrence A., et al.; "Indexes for User Access to Large Video Databases"; Storage and Retrieval for Image and Video Databases II, IS&T/SPIE Symp. On Elec. Imaging Sci. & Tech.; San Jose, CA; Feb. 1994; 12 pages.

Polybius; "The Histories," vol. III: Books 5-8; Harvard University Press; 1923; pp. 385 & 387.

Crisman, P.A. (editor); "The Compatible Time-Sharing System: A Programmer's Guide," second edition; The M.I.T. Press, Cambridge Massachusetts; 1965; 587 pages.

Kotadia, Munir; "Gates Predicts Death of the Password"; http://www.cnet.com/news/gates-predicts-death-of-the-password/?ftag=CADe856116&bhid=; Feb. 25, 2004; 3 pages.

Morris, Robert, et al.; "Password Security: A Case History"; Communications of the ACM, vol. 22, No. 11; Nov. 1979; pp. 594-597.

Cranor, Lorrie Faith, et al.; "Security and Usability: Designing Secure Systems that People Can Use"; O'Reilly Media; Aug. 2005; pp. 3 & 104.

Chirillo, John; "Hack Attacks Encyclopedia: A Complete History of Hacks, Cracks, Phreaks, and Spies Over Time"; John Wiley & Sons, Inc.; 2001; 485-486.

Stonebraker, Michael, et al.; "Object-Relational DBMSs: Tracking the Next Great Wave"; Second Ed.; Morgan Kaufmann Publishers, Inc.; 1999; pp. 3, 173, 232-237, 260.

Stonebraker, Michael, et al.; "Object-Relational DBMSs: The Next Great Wave"; Morgan Kaufmann Publishers, Inc.; 1996; pp. 105, 107, 166-168.

Barwick, Sandra; "Two Wheels Good, Four Wheels Bad"; The Independent; http://www.independent.co.uk/voices/two-wheels-good-four-wheels-bad-1392034.html; Feb. 4, 1994; 11 pages.

McFee, John E., et al.; "Multisensor Vehicle-Mounted Teleoperated Mine Detector with Data Fusion"; SPIE Proceedings, vol. 3392; Apr. 13, 1998; 2 pages.

Malcolm, Andrew H.; "Drunken Drivers Now Facing Themselves on Video Camera"; The New York Times; http://www.nytimes.com/1990/04/21/us/drunken-drivers-now-facing-themselves-on-video-camera.html; Apr. 21, 1990; 3 pages.

Kaplan, A.E., et al.; "An Internet Accessible Telepresence"; Multimedia Systems, vol. 5, Issue 2; Mar. 1997; Abstract only; 2 pages.

Sabatini, Richard V.; "State Police Cars in Pa. Get Cameras Patrol Stops Will be Videotaped. The Units will Benefit Citizens and Police, Authorities Say"; http://articles.philly.com/1996-03-30/news/25637501_1_patrol-car-state-police-commissioner-paul-j-evanko; Mar. 30, 1996; 2 pages.

Stockton, Gregory R., et al.; "Why Record? (Infrared Video)"; Infraspection Institute's IR/INFO '98 Symposium, Orlando, Florida; Jan. 25-28, 1998; 5 pages.

Racepak LLC; "Racepak DataLink Software" http://www.racepak.com/software.php.; Feb. 3, 2008; 4 pages.

Pavlopoulos, S., et al.; "A Novel Emergency Telemedicine System Based on Wireless Communication Technology—Ambulance"; IEEE Trans Inf Technol Biomed, vol. 2, No. 4; Dec. 1998; Abstract only; 2 pages.

Horne, Mike; "Future Video Accident Recorder"; http://www.iasa.com.au/folders/Publications/pdf_library/horne.pdf; May 1999; 9 pages.

Townsend & Taphouse; "Microsentinel I"; http://www.blacksheepnetworks.com/security/resources/encyclopedia/products/prod19.htm; Jul. 5, 2003; 1 page.

Security Data Networks, Inc.; "Best of Show Winner at CES Consumer Electronics Show is MicroSentinel(R) Wireless Internet Based Security System that Allows Users to Monitor their Home, Family, or Business using any Internet or E-Mail Connection"; PR Newswire; http://www.prnewswire.com/news-releases/best-of-show-winner-at-ces-consumer-electronics-show-is-microsentinelr-wireless-internet-based-security-system-that-allows-users-to-monitor-their-home-family-or-business-using-any-internet-or-e-mail-connection-73345197.html; Jan. 7, 1999; 3 pages.

Draper, Electra; "Mission Possible for Loronix"; Denver Post; http://extras.denverpost.com/business/top100b.htm; Aug. 13, 2000; 2 pages.

"Choosing the Right Password"; The Information Systems Security Monitor (ISSM); vol. 2, No. 2; Apr. 1992; 2 pages.

Aref, Walid G., et al.; "A Video Database Management System for Advancing Video Database Research"; In Proc. of the Int Workshop on Management Information Systems; Nov. 2002; 10 pages.

ICOP Extreme Wireless Mic, Operation Supplement; 2008.

Raytheon JPS Communications, Ratheon Model 20/20-W, Raytheon 20/20 Vision Digital In-Car Video Systems; Feb. 2010.

Product Review: ICOP Model 20/20-W; May 19, 2009.

State of Utah Invitation to Bid State Cooperative Contract, Contract No. MA503; Jul. 3, 2008.

X26 Taser; date unknown.

Taser X26 Specification Sheet; 2003.

Affidavit of Christopher Butler of Internet Archive attesting to the public availability of the 20/20-W Publication on Nov. 25, 2010.

International Association of Chiefs of Police Digital Video System Minimum Specifications Nov. 21, 2008.

City of Pomona Request for Proposal for Mobile Video Recording System for Police Vehicles; Apr. 4, 2013.

"Taser Int'l (TASR) Challenges to Digital Ally's (DGLY) Patents", StreetInsider.com, http://www.streetinsider.com/Corporate+News/Taser+Intl+(Taser)+Challenges+to+Digital+Allys+(DGLY)+Patents/12302550.html Dec. 1, 2016.

Sony Corporation; "Network Camera: User's Guide: Software Version 1.0: SNC-RZ25N/RZ25P"; 2004; 81 pages.

* cited by examiner

SYSTEMS AND METHODS FOR ADAPTIVE FREQUENCY SYNCHRONIZATION

CROSS-REFERENCE TO RELATED APPLICATION

This application is a continuation of U.S. patent application Ser. No. 14/595,978, filed on Jan. 13, 2015. U.S. patent application Ser. No. 14/595,978 is incorporated herein by reference.

BACKGROUND

Technical Field

The present disclosure relates generally to wireless devices and more particularly, but not by way of limitation, to systems and methods for adaptive frequency synchronization.

History of Related Art

It is common for police officers to patrol together, respond to a same event, or otherwise work in close proximity to each other. In many cases, each officer may be wearing a wireless microphone. This may cause multiple transmitter-receiver pairs to be transmitting in the same physical area such that each receiver can detect the wireless signal of each transmitter and vice versa. The transmitter-receiver pairs may interfere with each other and cause audio to be lost.

SUMMARY OF THE INVENTION

In one embodiment, a method includes receiving transmission segments from at least one device over a plurality of channels pursuant to a channel-switching schedule, the channel-switching schedule comprising an iteratively-repeated channel sequence. The iteratively-repeated channel sequence comprises a plurality of channels, the channel-switching schedule specifying an assigned transmission duration for each channel. In addition, the method includes, for at least one channel of the plurality of channels, detecting interference during a time segment of the assigned transmission duration, the time segment comprising at least one of a beginning portion and an ending portion of the assigned transmission duration. Further, the method includes responsive to the detected interference, determining to shift, by a specified quantity of time, a future channel switch indicated by the iteratively-repeated channel sequence.

In one embodiment, a system includes at least one processor, wherein the at least one processor is operable to implement a method. The method includes receiving transmission segments from at least one device over a plurality of channels pursuant to a channel-switching schedule, the channel-switching schedule comprising an iteratively-repeated channel sequence. The iteratively-repeated channel sequence comprises a plurality of channels, the channel-switching schedule specifying an assigned transmission duration for each channel. In addition, the method includes, for at least one channel of the plurality of channels, detecting interference during a time segment of the assigned transmission duration, the time segment comprising at least one of a beginning portion and an ending portion of the assigned transmission duration. Further, the method includes responsive to the detected interference, determining to shift, by a specified quantity of time, a future channel switch indicated by the iteratively-repeated channel sequence.

In one embodiment, a computer-program product includes a non-transitory computer-usable medium having computer-readable program code embodied therein. The computer-readable program code is adapted to be executed to implement a method. The method includes receiving transmission segments from at least one device over a plurality of channels pursuant to a channel-switching schedule, the channel-switching schedule comprising an iteratively-repeated channel sequence. The iteratively-repeated channel sequence comprises a plurality of channels, the channel-switching schedule specifying an assigned transmission duration for each channel. In addition, the method includes, for at least one channel of the plurality of channels, detecting interference during a time segment of the assigned transmission duration, the time segment comprising at least one of a beginning portion and an ending portion of the assigned transmission duration. Further, the method includes responsive to the detected interference, determining to shift, by a specified quantity of time, a future channel switch indicated by the iteratively-repeated channel sequence.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
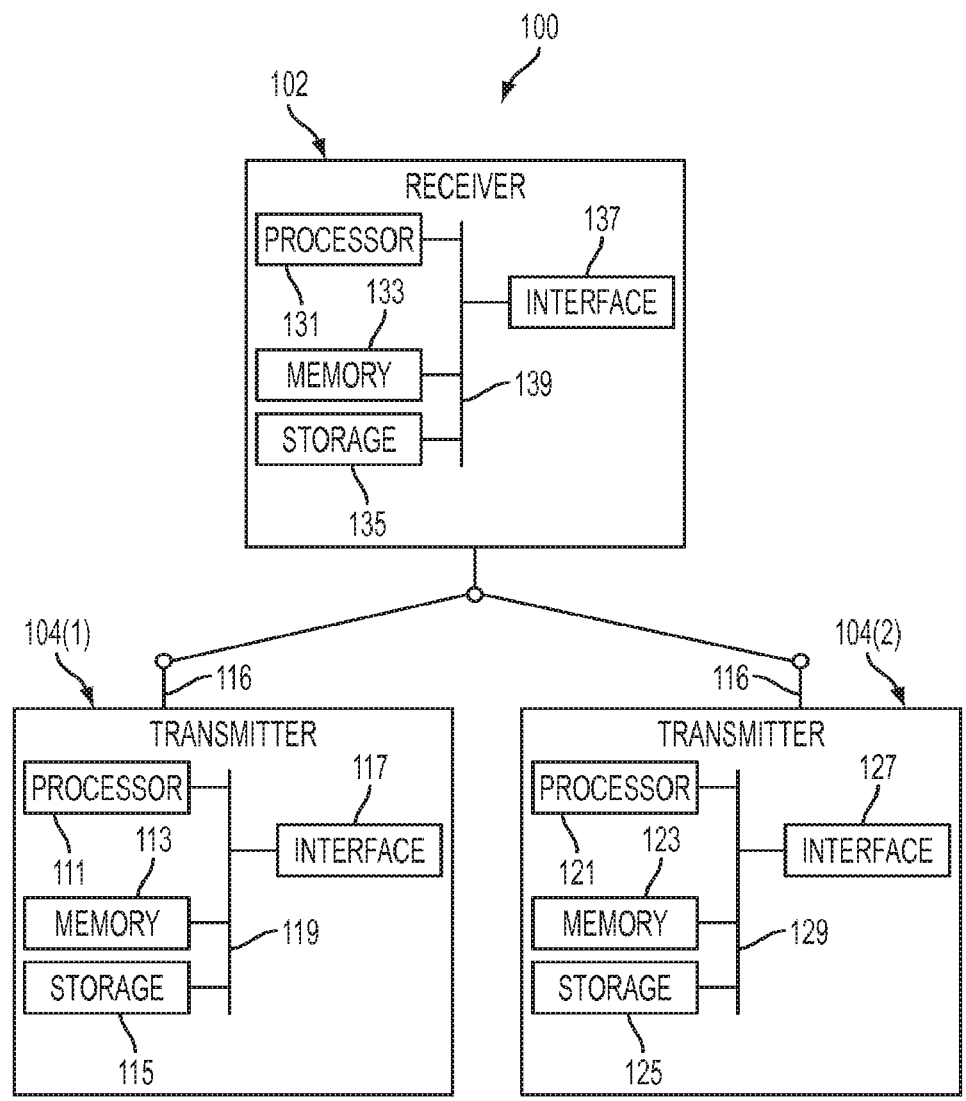
FIG. 1 illustrates an example of a system for automatically adapting channel-switching schedules in response to detected interference.

An in-car video system for law enforcement can include a wireless microphone system. The wireless microphone system typically includes a transmitter and a receiver. A police officer, for example, can wear a wireless microphone transmitter so that the officer's voice and the voice of anyone conversing with the officer can be captured when the officer is outside a patrol vehicle. A wireless microphone receiver can be mounted in the patrol vehicle and connected (e.g., wired) to the in-car video system. Audio can be captured by the wireless microphone transmitter and transmitted wirelessly to the wireless microphone receiver. The wireless microphone receiver can send the audio through an interface (e.g., a wired interface) to the in-car video system. In various cases, the in-car video system may combine this audio with video from one or more cameras and audio from one or more audio sources into one or more audio/video streams that are stored in the vehicle. The streams can be reviewed in the vehicle or transmitted to another storage location for archival and/or retrieval.

One way to minimize interference during wireless transmissions is to use a frequency hopping spread spectrum (FHSS). The FHSS can be used to transmit radio signals by rapidly switching a carrier among many frequency channels according to a channel-switching schedule known to both the transmitter and the receiver. The channel-switching schedule can be, for example, an iteratively repeated channel sequence or hopping pattern that specifies an assigned transmission duration for each channel. In some cases, the iteratively repeated channel sequence can be a pseudorandom sequence of channels.

The FHSS approach described above, however, can still permit interference in many circumstances. For example, when two officers patrol together in the same patrol vehicle, each wearing a wireless microphone, two transmitter-receiver pairs may be transmitting in the same physical area. The transmitter-receiver pairs may periodically interfere with each other and cause audio to be lost on one or both officers' wireless microphones. The problem is potentially made worse when multiple patrol vehicles arrive at a scene at the same time, each patrol vehicle potentially having two transmitter-receiver pairs. As more pairs enter the same physical area, the chances for interference (and therefore lost audio) increases.

The present disclosure describes examples of adapting a channel-switching schedule in response to detected interference. In certain embodiments, interference can be detected for individual segments of an assigned transmission duration for each channel of the channel-switching schedule. In certain embodiments, when interference is detected during a particular time segment of the assigned transmission duration, a future channel switch can be shifted by a specified quantity of time. Advantageously, in various cases, this shift can result in an automatically adapted channel-switching schedule that results in reduced interference during wireless transmission.

FIG. 1 illustrates an example of a system 100 for automatically adapting channel-switching schedules in response to detected interference. The system 100 includes a receiver 102, a transmitter 104(1), and a transmitter 104(2). In some embodiments, the receiver 102 can be a wireless microphone receiver and the transmitter 104(1) and the transmitter 104(2) can each be wireless microphone transmitters. It should be appreciated that, although the receiver 102, the transmitter 104(1) and the transmitter 104(2) are described with particular regard to "transmitter" or "receiver" functionality, in various embodiments, each illustrated device may be a transceiver operable to both transmit and receive, as appropriate.

In the illustrated embodiment, the receiver 102 can form a transmitter-receiver pair with each of the transmitter 104(1) and the transmitter 104(2). Accordingly, a channel-switching schedule can be established for each transmitter-receiver pair. A transmitter-receiver pair typically determines the channel-switching schedule during a synchronization phase of initialization. In some embodiments, receivers such as the receiver 102 may only form a transmitter-receiver pair with a single transmitter so that each transmitter has its own receiver. In other embodiments, as illustrated, receivers such as the receiver 102 may be able to form a transmitter-receiver pair with two or more transmitters.

For example, in the embodiment illustrated, the receiver 102 can send a synchronization packet to each of the transmitter 104(1) and the transmitter 104(2). This synchronization packet can inform the transmitter 104(1) and the transmitter 104(2) when the receiver 102 will be switching channels and what the pseudorandom frequency-hopping pattern will be. The synchronization phase can establish the paired nature of each transmitter-receiver pair. In certain embodiments, each channel-switching schedule can be based on a same pseudorandom frequency-hopping pattern so that, at least initially, each channel-switching schedule uses a same sequence of channels (although channel-switch timing may vary).

In certain embodiments, the receiver 102 can detect interference in transmissions received from the transmitter 104(1) and the transmitter 104(2) based, at least in part, on an assessment of reception quality. The receiver 102 can record information regarding cumulative health of each transmission segment in the storage 135 or other memory. Example operation of the receiver 102 and the transmitters 104(1) and 104(2) will be described with respect to FIGS. 3-4.

The transmitter 104(1), transmitter 104(2), and receiver 102 may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of transmitter 104(1), transmitter 104(2), and receiver 102 may comprise any suitable physical form, configuration, number, type and/or layout. As an example, and not by way of limitation, transmitter 104(1), transmitter 104(2), and/or receiver 102 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, transmitter 104(1), transmitter 104(2), and/or receiver 102 may include one or more computer systems; be unitary or distributed; span multiple locations; or span multiple machines.

In the depicted embodiment, transmitter 104(1), transmitter 104(2), and receiver 102 each include their own respective processors 111, 121, and 131; memory 113, 123, and 133; storage 115, 125, and 135; interfaces 117, 127, and 137; and buses 119, 129, and 139. Although a particular system is depicted having a particular number of particular components in a particular arrangement, this disclosure contemplates any suitable system having any suitable number of any suitable components in any suitable arrangement. For simplicity, similar components of transmitter 104(1), transmitter 104(2), and receiver 102 will be discussed together while referring to the components of transmitter 104(1). However, it is not necessary for these devices to have the same components, or the same type of components. For example, processor 111 may be a general purpose microprocessor and processor 121 may be an application specific integrated circuit (ASIC).

Processor 111 may be a microprocessor, controller, or any other suitable computing device, resource, or combination of hardware, software and/or encoded logic operable to provide, either alone or in conjunction with other components, (e.g., memory 113) wireless networking functionality. Such functionality may include providing various features discussed herein. In particular embodiments, processor 111 may include hardware for executing instructions, such as those making up a computer program. As an example and not by way of limitation, to execute instructions, processor 111 may retrieve (or fetch) instructions from an internal register, an internal cache, memory 113, or storage 115;

decode and execute them; and then write one or more results to an internal register, an internal cache, memory 113, or storage 115.

In particular embodiments, processor 111 may include one or more internal caches for data, instructions, or addresses. This disclosure contemplates processor 111 including any suitable number of any suitable internal caches, where appropriate. As an example and not by way of limitation, processor 111 may include one or more instruction caches, one or more data caches, and one or more translation lookaside buffers (TLBs). Instructions in the instruction caches may be copies of instructions in memory 113 or storage 115 and the instruction caches may speed up retrieval of those instructions by processor 111. Data in the data caches may be copies of data in memory 113 or storage 115 for instructions executing at processor 111 to operate on; the results of previous instructions executed at processor 111 for access by subsequent instructions executing at processor 111, or for writing to memory 113, or storage 115; or other suitable data. The data caches may speed up read or write operations by processor 111. The TLBs may speed up virtual-address translations for processor 111. In particular embodiments, processor 111 may include one or more internal registers for data, instructions, or addresses. Depending on the embodiment, processor 111 may include any suitable number of any suitable internal registers, where appropriate. Where appropriate, processor 111 may include one or more arithmetic logic units (ALUs); be a multi-core processor; include one or more processors 111; or any other suitable processor.

Memory 113 may be any form of volatile or non-volatile memory including, without limitation, magnetic media, optical media, random access memory (RAM), read-only memory (ROM), flash memory, removable media, or any other suitable local or remote memory component or components. In particular embodiments, memory 113 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 113 may include one or more memories 113, where appropriate. Memory 113 may store any suitable data or information utilized by transmitter 104(1), including software embedded in a computer readable medium, and/or encoded logic incorporated in hardware or otherwise stored (e.g., firmware). In particular embodiments, memory 113 may include main memory for storing instructions for processor 111 to execute or data for processor 111 to operate on. In particular embodiments, one or more memory management units (MMUs) may reside between processor 111 and memory 113 and facilitate accesses to memory 113 requested by processor 111.

As an example and not by way of limitation, transmitter 104(1) may load instructions from storage 115 or another source (such as, for example, another computer system) to memory 113. Processor 111 may then load the instructions from memory 113 to an internal register or internal cache. To execute the instructions, processor 111 may retrieve the instructions from the internal register or internal cache and decode them. During or after execution of the instructions, processor 111 may write one or more results (which may be intermediate or final results) to the internal register or internal cache. Processor 111 may then write one or more of those results to memory 113. In particular embodiments, processor 111 may execute only instructions in one or more internal registers or internal caches or in memory 113 (as opposed to storage 115 or elsewhere) and may operate only on data in one or more internal registers or internal caches or in memory 113 (as opposed to storage 115 or elsewhere).

In particular embodiments, storage 115 may include mass storage for data or instructions. As an example and not by way of limitation, storage 115 may include a hard disk drive (HDD), a floppy disk drive, flash memory, an optical disc, a magneto-optical disc, magnetic tape, or a Universal Serial Bus (USB) drive or a combination of two or more of these. Storage 115 may include removable or non-removable (or fixed) media, where appropriate. Storage 115 may be internal or external to transmitter 104(1), where appropriate. In particular embodiments, storage 115 may be non-volatile, solid-state memory. In particular embodiments, storage 115 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 115 may take any suitable physical form and may comprise any suitable number or type of storage. Storage 115 may include one or more storage control units facilitating communication between processor 111 and storage 115, where appropriate.

In particular embodiments, interface 117 may include hardware, encoded software, or both providing one or more interfaces for communication (such as, for example, packet-based communication) among transmitter 104(1), transmitter 104(2), receiver 102, any networks, any network devices, and/or any other computer systems. As an example and not by way of limitation, communication interface 117 may include a network interface controller (NIC) or network adapter for communicating with an Ethernet or other wire-based network and/or a wireless NIC (WNIC) or wireless adapter for communicating with a wireless network.

In some embodiments, interface 117 comprises one or more radios coupled to one or more physical antenna ports 116. Depending on the embodiment, interface 117 may be any type of interface suitable for any type of network for which wireless network 200 is used. As an example and not by way of limitation, wireless network 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, wireless network 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. transmitter 104(1) may include any suitable interface 117 for any one or more of these networks, where appropriate.

In some embodiments, interface 117 may include one or more interfaces for one or more I/O devices. One or more of these I/O devices may enable communication between a person and transmitter 104(1). As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 117 for them. Where appropriate, interface 117 may include one or more drivers enabling processor 111 to drive one or more of these I/O devices. Interface 117 may include one or more interfaces 117, where appropriate.

Bus 119 may include any combination of hardware, software embedded in a computer readable medium, and/or encoded logic incorporated in hardware or otherwise stored (e.g., firmware) to couple components of transmitter 104(1) to each other. As an example and not by way of limitation, bus 119 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 119 may include any number, type, and/or configuration of buses 119, where appropriate. In particular embodiments, one or more buses 119 (which may each include an address bus and a data bus) may couple processor 111 to memory 113. Bus 119 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 111 (such as, for example, one or more internal registers or caches), one or more portions of memory 113, one or more portions of storage 115, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 2:
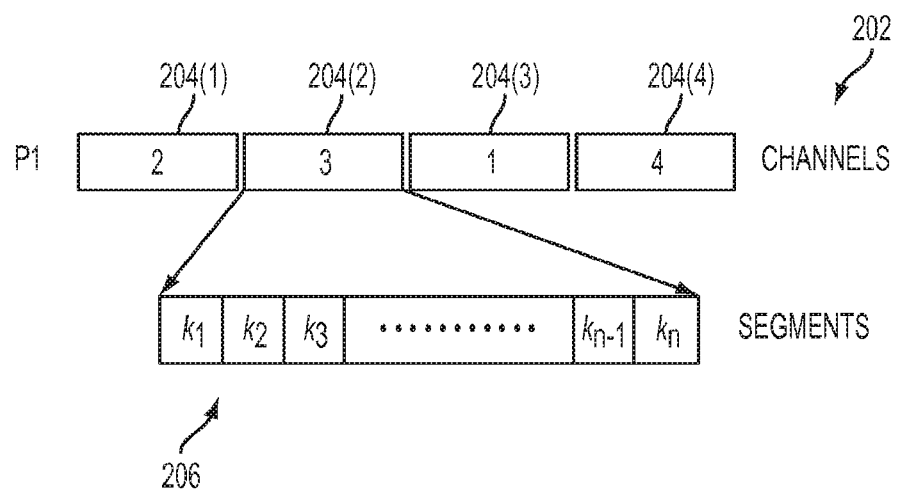
FIG. 2 illustrates an example of a channel sequence.

FIG. 2 illustrates an example of a channel sequence 202 that can form the basis for adaptive channel switching using the system 100. As illustrated, the channel sequence 202 includes channels 204(1), 204(2), 204(3), and 204(4) (collectively, channels 204). In certain embodiments, an assigned transmission duration of the channels 204 can be divided into measurement segments. For example, the channel 204(2) is shown to have an assigned transmission duration of kn transmission segments. In other words, according to this example, kn transmission segments are transmitted on the channel 204(2) before a switch is made to the channel 204(3). In some embodiments, all of the channels 204 can have an assigned transmission duration of kn transmission segments.

Figure 3:
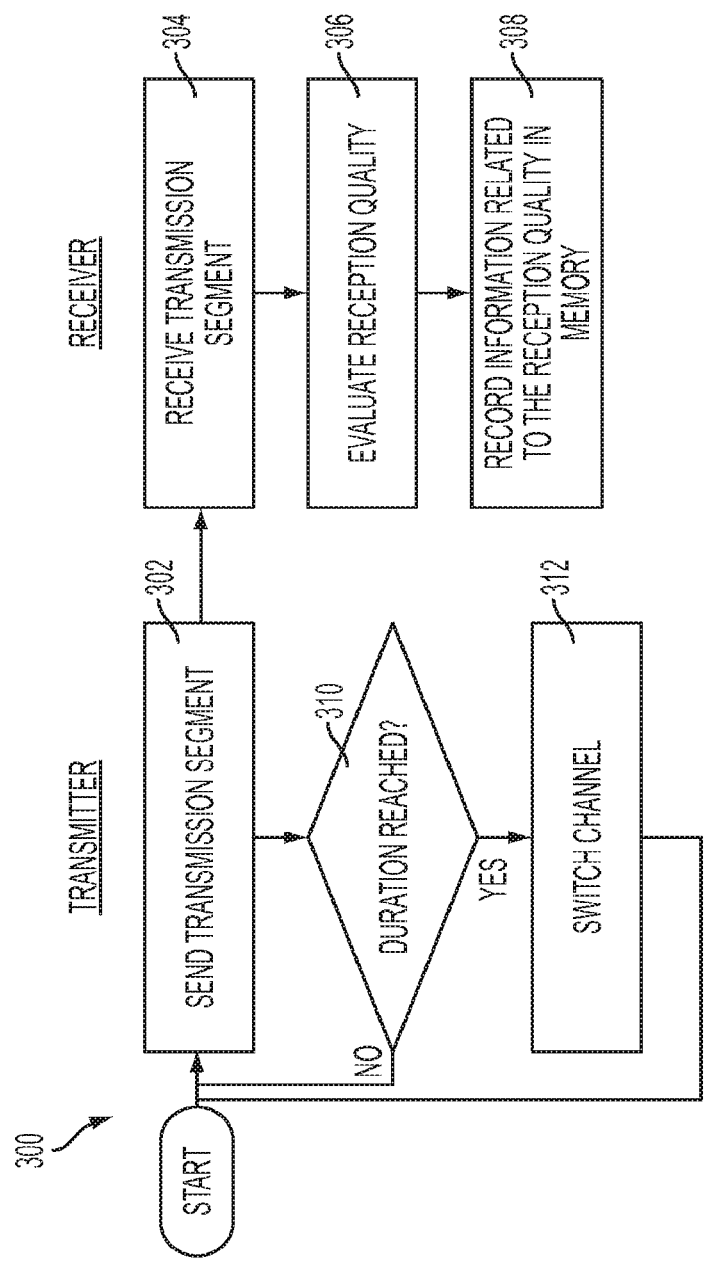
FIG. 3 illustrates an example of a process for executing a channel-switching schedule.

FIG. 3 illustrates an example of a process 300 for a transmitter-receiver pair executing a channel-switching schedule. For example, the process 300, in whole or in part, can be implemented by one or more of the receiver 102, the transmitter 104(1), and/or the transmitter 104(2). The process 300 can also be performed generally by the system 100. Although any number of systems, in whole or in part, can implement the process 300, to simplify discussion, the process 300 will be described in relation to specific systems or subsystems of the system 100. In particular, for illustrative purposes, the transmitter-receiver pair of the process 300 will be described as including the transmitter 104(1) and the receiver 102 of FIG. 1.

At block 302, the transmitter 104(1) sends a transmission segment to the receiver 102. From block 302, the process 300 can proceed to blocks 304 and 310 in parallel or substantially in parallel. At block 304, the receiver 102 receives the transmission segment. At block 306, the receiver 102 evaluates a reception quality of the transmission segment. As described with respect to FIG. 2, the transmission on a particular channel, or a transmission duration, can be divided into transmissions segments. The evaluation can include applying a checksum, cyclic redundancy check (CRC), and/or another data-integrity algorithm to the transmission segment. Each segment also typically contains a segment sequence identifier to specify the segment's location within the transmission (e.g., k1, k2, etc.).

At block 308, the receiver 102 records information related to the reception quality in memory. For example, the information can include an indication of whether the transmission segment failed any of the data-integrity algorithms described above. Such information can be stored in relation to the segment sequence identifier of the segment. In addition, or alternatively, the recorded information can include an update to statistics maintained for the segment sequence identifier. In some cases, the block 308 can include generating or determining statistical data.

In an example, the receiver 102 can determine and/or maintain, for a particular channel, a number of times, a percentage of times, combinations of same, and/or the like, that the segments corresponding to the segment sequence identifier have failed one or more data-integrity algorithms. According to this example, the receiver 102 could determine that segment k1 on the particular channel has failed an applicable data-integrity algorithm nine times, ninety percent of the time, combinations of same, and/or the like.

In another example, the receiver 102 can determine and/or maintain a number of times or percentage of times, across all channels, that a given segment sequence identifier fails one or more data-integrity algorithms. According to this example, the receiver 102 could determine that a segment k1 fails an applicable data-integrity algorithm eighty times, sixty percent of the time, combinations of same, and/or the like. It should be appreciated that the foregoing statistics are presented herein only as illustrative examples. In certain embodiments, the receiver 102 can determine and/or maintain any of the foregoing example statistics and/or other statistics. In particular, other statistics of a desired granularity can also be used and will be apparent to one skilled in the art after reviewing the present disclosure.

At decision block 310, the transmitter 104(1) determines whether an assigned transmission duration has been reached. As mentioned above, in certain embodiments, the assigned transmission duration can be defined in terms of a number of transmission segments. In other cases, the assigned transmission duration can be defined in other ways such as, for example, in terms of units of time. If it is determined at the decision block 310 that the assigned transmission duration has not been reached, the process 300 returns to block 302 and proceeds as described above. Otherwise, if it is determined at the decision block 310 that the assigned transmission duration has been reached, the process 300 proceeds to block 312.

At block 312, the transmitter 104(1) switches to a next channel specified by the channel-switching schedule. For example, with respect to FIG. 2, if the transmitter 104(1) is currently transmitting on the channel 204(4), the transmitter 104(1) can begin transmitting on the channel 204(1). According to this example, the receiver 102 can similarly begin listening for transmissions by the transmitter 104(1) on the channel 204(1). After block 312, the process 300 returns to block 302 and proceeds as described above. In general, the process 300 can continue indefinitely until terminated (e.g., by a user) or other suitable stop criteria is satisfied.

Figure 4:
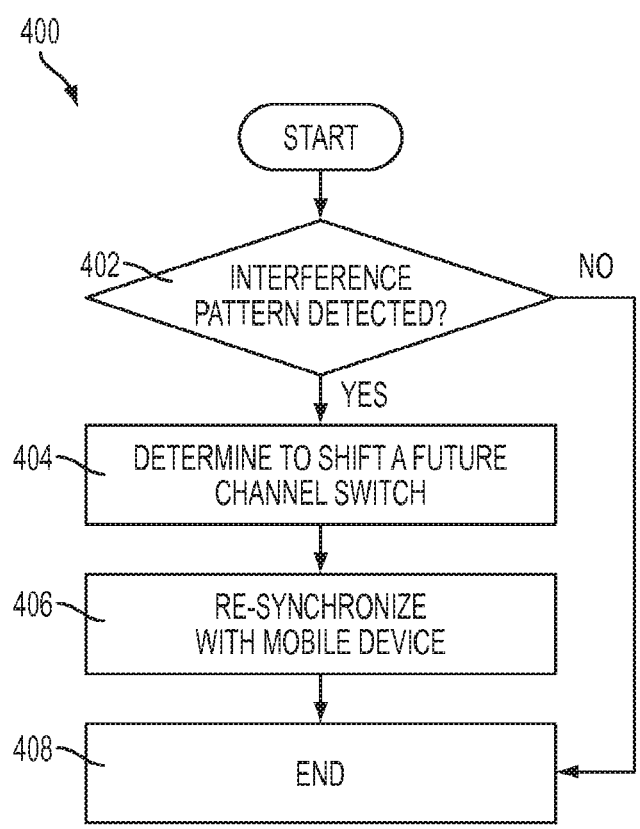
FIG. 4 illustrates an example of a process for adapting a channel-switching schedule.

FIG. 4 illustrates an example of a process 400 for adapting a channel-switching schedule. In certain embodiments, the process 400 can be performed periodically or at defined intervals as an optimization process. In some embodiments, the process 400 can be performed, for example, upon receipt of each transmission segment. For example, the process 400, in whole or in part, can be implemented by one or more of the receiver 102, the transmitter 104(1), and/or the transmitter 104(2). The process 400 can also be performed generally by the system 100. Although any number of systems, in whole or in part, can implement the process 400, to simplify discussion, the process 400 will be described in relation to specific systems or subsystems of the system 100. In particular, for illustrative purposes, the transmitter-receiver pair of the process 400 will be described as including the transmitter 104(1) and the receiver 102 of FIG. 1.

At decision block 402, the receiver 102 determines whether an interference pattern is detected based on configurable criteria. In an example, an interference threshold can be established in terms of a number of times or a percentage of times that a data-integrity algorithm fails. According to this example, an interference pattern could be detected from the fact that the interference threshold is satisfied for a same relative time segment of each channel of the channel-switching schedule (e.g., segment kn satisfies the interference threshold for all channels in the channel-switching schedule). The same relative time segment can correspond, for example, to a particular transmission segment as identified by a segment sequence identifier (e.g., kn), two or more such segments that are contiguous (e.g., kn-2, kn-1 and kn), combinations of same, and/or the like. If the decision block 402 results in a negative determination, the process 400 proceeds to block 408 and ends. Otherwise, if it is determined at the decision block 402 that an interference pattern is detected, the process 400 proceeds to block 404.

At block 404, the receiver 102 determines to shift, by a specified quantity of time, a future channel switch specified by the channel-switching schedule. In an example, if the detected interference pattern relates to one or more segments at the end of each assigned transmission duration, the receiver 102 can determine to advance, or accelerate, the next channel switch by the specified quantity of time. In another example, if the detected interference pattern relates to one or more segments at the beginning of each assigned transmission duration, the receiver 102 can determine to delay the next channel switch by the specified quantity of time.

In certain embodiments, the advancement or delay of the future channel switch does not modify a channel sequence of the channel-switching schedule but only time shifts its execution. For example, the advancement or delay of the future channel-switching schedule can have the effect of shifting an entirety of the channel-switching schedule by the specified quantity of time. The specified quantity of time can be, for example, a predetermined unit (e.g., one transmission segment), a fractional portion of the duration of the segment(s) over which interference was detected, etc.

At block 406, the receiver 102 resynchronizes with the transmitter 104(1) so as to enact the determined shift. For example, the receiver 102 can send a resynchronization packet with information similar to the initial synchronization packet and adjust its own channel-switching time. The transmitter 104(1) can receive the resynchronization packet and adjust its channel-switching time to match the new channel-switching time of the receiver 102. At block 408, the process 400 ends.

Figure 5:
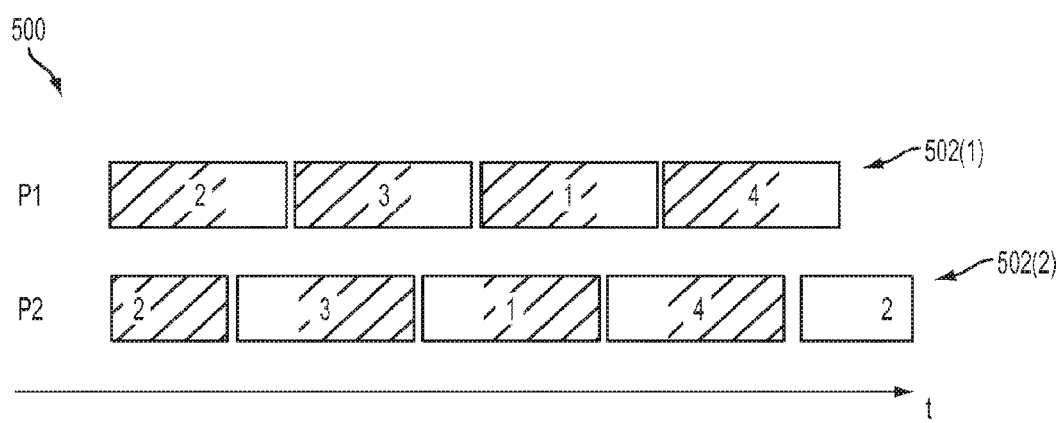
FIG. 5 illustrates an example of adapting channel-switching schedules.

FIG. 5 illustrates an example 500 of adapting a channel-switching schedule 502(1) and a channel-switching schedule 502(2). The channel-switching schedule 502(1) and the channel-switching schedule 502(2) can correspond to a transmitter-receiver pair P1 and a transmitter-receiver pair P2, respectively. For simplicity of description, adaptation functionality will be described as being performed by the transmitter-receiver pair P1 or the transmitter-receiver pair P2. However, it should be appreciated that any such actions may actually be performed by a particular component thereof such as, for example, a receiver of the transmitter-receiver pair P1 or P2. It should be appreciated that, in some cases, the transmitter-receiver pair P1 and the transmitter-receiver P2 may include a same receiver while, in other cases, each can include a different receiver.

In the illustrated embodiment, periods of interference between the channel-switching schedules 502(1) and 502(2) are shown via shading. The transmitter-receiver pairs P1 and P2 can each independently use a process such as the process 400 of FIG. 4 to detect the interference and adapt the channel-switching schedules 502(1) and 502(2), respectively.

According to this example, the transmitter-receiver pair P1 can detect a pattern of interference at a beginning of an assigned transmission duration of each channel (e.g., interference during transmission segments k1 and k2). The transmitter-receiver pair P1 can adapt the channel-switching schedule 502(1) by delaying a future channel switch by a specified quantity of time. As described above, in certain embodiments, the specified quantity of time can be expressed in terms of a number of transmission segments. For example, the transmitter-receiver pair P1 can delay a next channel switch by the number of transmission segments for which interference has been detected to occur (i.e., interference segments), a fractional portion of the interference segments, a predefined number of transmission segments (e.g., one transmission segment so as to enable gradual or incremental adaptation), combinations of same, and/or the like. In a typical embodiment, delaying the future channel switch by the specified quantity of time has the effect of delaying an entirety of the channel-switching schedule by the specified quantity of time, thereby reducing the likelihood of future interference.

In similar fashion, the transmitter-receiver pair P2 can detect a pattern of interference at an end of an assigned transmission duration of each channel (e.g., interference during transmission segments kn-1 and kn). The transmitter-receiver pair P2 can adapt the channel-switching schedule 502(2) by accelerating a future channel switch by a specified quantity of time. As described above, the specified quantity of time can, in some cases, be expressed in terms of a number of transmission segments. For example, the transmitter-receiver pair P1 can accelerate, or advance, a next channel switch by the number of transmission segments for which interference is has been detected to occur (i.e., interference segments), a fractional portion of the interference segments, a predefined number of transmission segments (e.g., one transmission segment so as to enable gradual or incremental adaptation), combinations of same, and/or the like.

The transmitter-receiver pair P1 and the transmitter-receiver P2 can each perform the above-described adaptations in parallel. Advantageously, in certain embodiments, numerous transmitter-receiver pairs can be configured to execute a same adaptation algorithm such as one or more of the algorithms detailed above. Further, in certain embodiments, each transmitter-receiver pair can use a same pseudorandom sequence to initially set a channel-switching schedule. In this fashion, the channel-switching schedule for each transmitter-receiver pair can include a same sequence of channels. When some of the transmitter-receiver pairs are located in a same physical area, each pair can independently adapt a corresponding channel-switching schedule. In that way, the independent and parallel execution of the same adaptation algorithm can achieve a synergy that, in many cases, results in interference between the pairs being reduced or eliminated.

Figure 6:
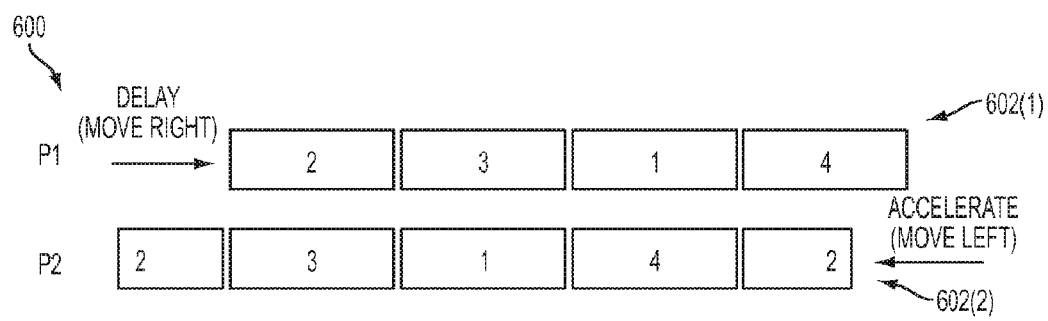
FIG. 6 illustrates an example of adapting channel-switching schedules.

FIG. 6 illustrates an example 600 of an adapted channel-switching schedule 602(1) and an adapted channel-switching schedule 602(2). The adapted channel-switching schedule 602(1) and the adapted channel-switching schedule 602(2) are example results of adapting the channel-switching schedule 502(1) and the channel-switching schedule 502(2), respectively, of FIG. 5. For purposes of this example, interference between the transmitter-receiver pair P1 and the transmitter-receiver pair P2 is shown to be eliminated. It should be appreciated that, in some cases, the adapted channel-switching schedule 602(1) and the adapted channel-switching schedule 602(2) can result from a series of incremental adaptations implemented by the transmitter-receiver pair P1 and the transmitter-receiver pair P2.

For simplicity of description and illustration, various examples are described above in which channel-switching schedules include a particular number of channels (e.g., four). It should be appreciated that, in various embodiments, much larger numbers of channels may be utilized. In an example, in implementations using IEEE 802.11n in the 2.4 GHz range, fourteen channels can be used. In another example, an implementation in the industrial, scientific and medical (ISM) band (e.g., 902 to 928 MHz) may use 50 channels or more.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising:
    receiving transmission segments from at least one device pursuant to a channel-switching schedule, the channel-switching schedule comprising a frequency-hopping pattern, wherein the frequency-hopping pattern specifies an assigned transmission duration for each of a plurality of channels, the assigned transmission duration for each said channel comprising a plurality of time segments;
    detecting, for at least one channel of the plurality of channels, interference during at least one of a first time segment and a last time segment of the plurality of time segments of the assigned transmission duration; and responsive to the detected interference, shifting, by a quantity of time that is less than the assigned transmission duration of the at least one channel, a future channel switch indicated by the frequency-hopping pattern, the shifting comprising adding the at least one of the first time segment and the last time segment to the assigned transmission duration of a neighboring channel in the frequency-hopping pattern.

2. The method of claim 1, wherein the shifting comprises delaying the future channel switch by the quantity of time.

3. The method of claim 1, wherein the shifting comprises accelerating the future channel switch by the quantity of time.

4. The method of claim 1, wherein the shifting comprises shifting an entirety of the channel-switching schedule by the quantity of time.

5. The method of claim 1, wherein the shifting comprises synchronizing with the at least one device.

6. The method of claim 1, wherein the detecting comprises identifying an interference pattern in the plurality of channels.

7. The method of claim 1, wherein the detecting comprises:
   determining interference during a same relative time period of the assigned transmission duration of multiple channels of the plurality of channels; and
   the at least one of the first time segment and the last time segment corresponds to the same relative time period.

8. The method of claim 1, comprising:
   for each channel of the plurality of channels, during each iteration of the channel, evaluating a reception quality related to the at least one device's transmissions during each of a plurality of segments of the assigned transmission duration;
   wherein the at least one of the first time segment and the last time segment comprises one or more contiguous segments of the plurality of segments of the assigned transmission duration for the at least one channel; and
   wherein the detecting comprises determining that the reception quality during the at least one of the first time segment and the last time segment fails to satisfy at least one quality-related criterion.

9. The method of claim 8, wherein the evaluating comprises performing a data-integrity check.

10. The method of claim 1, wherein a plurality of receiver devices each independently perform the method such that the at least one device is distinct for each receiver device.

11. The method of claim 10, wherein each receiver device initially generates a same pseudorandom sequence, the pseudorandom sequence being used as the frequency-hopping pattern.

12. The method of claim 1, wherein the at least one device comprises a plurality of devices.

13. The method of claim 1, wherein the at least one device comprises a wireless microphone.

14. A system comprising at least one processor and memory, wherein the at least one processor and memory in combination are operable to implement a method comprising:
   receiving transmission segments from at least one device pursuant to a channel-switching schedule, the channel-switching schedule comprising a frequency-hopping pattern, wherein the frequency-hopping pattern specifies an assigned transmission duration for each of a plurality of channels, the assigned transmission duration for each said channel comprising a plurality of time segments;
   detecting, for at least one channel of the plurality of channels, interference during at least one of a first time segment and a last time segment of the plurality of time segments of the assigned transmission duration; and
   responsive to the detected interference, shifting, by a quantity of time that is less than the assigned transmission duration of the at least one channel, a future channel switch indicated by the frequency-hopping pattern, the shifting comprising adding the at least one of the first time segment and the last time segment to the assigned transmission duration of a neighboring channel in the frequency-hopping pattern.

15. The system of claim 14, wherein the shifting comprises delaying the future channel switch by the quantity of time.

16. The system of claim 14, wherein the shifting comprises accelerating the future channel switch by the quantity of time.

17. The system of claim 14, wherein the shifting comprises shifting an entirety of the channel-switching schedule by the quantity of time.

18. The system of claim 14, wherein the shifting comprises synchronizing with the at least one device.

19. A computer-program product comprising a non-transitory computer-usable medium having computer-readable program code embodied therein, the computer-readable program code adapted to be executed to implement a method comprising:
   receiving transmission segments from at least one device pursuant to a channel-switching schedule, the channel-switching schedule comprising a frequency-hopping pattern, wherein the frequency-hopping pattern specifies an assigned transmission duration for each of a plurality of channels, the assigned transmission duration for each said channel comprising a plurality of time segments;
   detecting, for at least one channel of the plurality of channels, interference during at least one of a first time segment and a last time segment of the plurality of time segments of the assigned transmission duration; and
   responsive to the detected interference, shifting, by a quantity of time that is less than the assigned transmission duration of the at least one channel, a future channel switch indicated by the frequency-hopping pattern, the shifting comprising adding the at least one of the first time segment and the last time segment to the assigned transmission duration of a neighboring channel in the frequency-hopping pattern.

* * * * *